Aug. 16, 1927.

E. SEAVEY 1,639,617

COMBINED HAIR COMB AND CUTTER

Filed Dec. 7, 1925

WITNESSES

INVENTOR
Eugene Seavey,
BY
ATTORNEYS

Patented Aug. 16, 1927.

1,639,617

UNITED STATES PATENT OFFICE.

EUGENE SEAVEY, OF RIDGEFIELD PARK, NEW JERSEY.

COMBINED HAIR COMB AND CUTTER.

Application filed December 7, 1925. Serial No. 73,841.

My invention relates to an attachment for shears, having means for combing the hair and for cutting the hair as in bobbing the same.

The general object of my invention is to provide a novel attachment of the indicated character that may be applied to any shears and be capable of use in a manner to enable one to cut one's own hair.

A more specific object of the invention is to provide a device of the indicated character in which the comb and attachment for use in cutting is embodied in a simple form and effective for its purpose.

Reference is to be had to the accompanying drawings forming a part of this specification, it being understood that the drawings are merely illustrative of examples of the invention.

Figure 1:
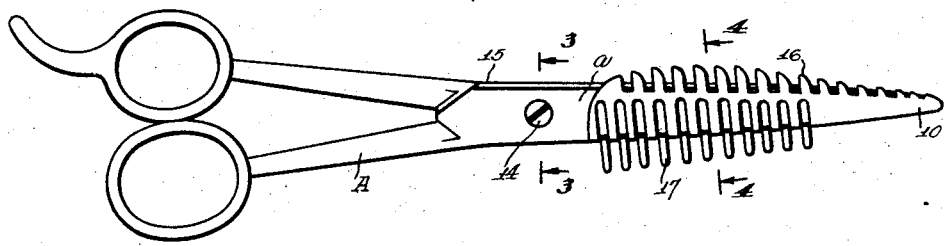
Figure 1 is a plan view of a scissors having my invention applied thereto.
Figure 2:
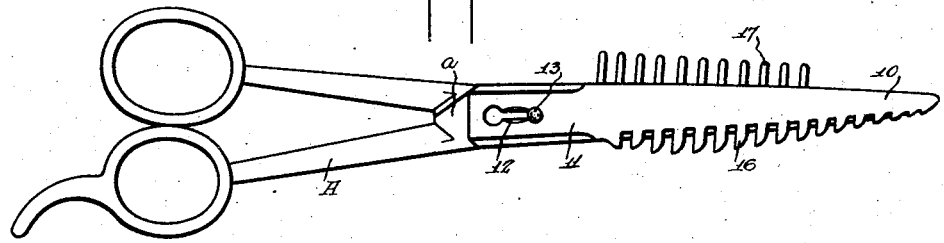
Figure 2 is a view similar to Figure 1 at the opposite side.
Figure 3:
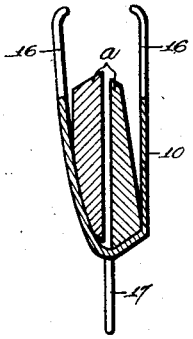
Figure 3 is a cross section on the line 3—3, Figure 1.

In carrying out my invention in accordance with the illustrated example, an attachment designated by the numeral 10 includes a body bent into approximately U-shape to accommodate between the sides thereof the blades $a$ of a shears A. The body of the attachment 10 has a shank 11 formed with a key-hole slot 12 through which the screw 14 holding the shear blades together may pass. The end of the screw 14 is undercut as at 13 so that the shank 11 at the sides of the narrow portion of slot 12 may pass beneath said undercut end.

The shank 11 in order to lie close to the blade $a$ to which it is applied is deflected at its side edge portions as at 15 to correspond with the bevel of the blade.

The sides of the body 10 are spaced when applied to the shears a sufficient distance to determine the length of the hair in the cutting. Each side has teeth 16, the teeth corresponding at each side. The teeth are gradually of reduced size from a point somewhat remote from shank 11 to the forward end and adjacent the shank 11 the teeth are of slightly reduced length, the maximum length of teeth being a short distance from the shank 11.

Figure 5:
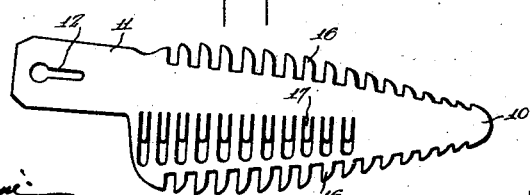
Figure 5 is a plan view of the cut blank before bending.

The body 10 is provided with a row of combing teeth 17 which are formed by stamping the same up from the material of the attachment between the toothed edges as clearly shown in the view of the blank, Figure 5. The teeth 17 project along a line adjacent the bend of the attachment so that they project at the back of the blades and in a plane between the planes of the toothed sides of the attachment. With the above described attachment when applied to the shears as shown in the drawings, the teeth 16 are passed through the hair at a point where the hair is to be cut and then the distance between the teeth 16 at one side and the medial plane between the blades $a$ determines the length of the hair. Combing teeth 17 are first passed through the hair to straighten it before the teeth 16 are passed into the hair for cutting.

Figures 4, 6:
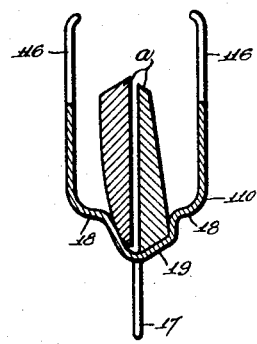
Figure 4 is a cross section on the line 4—4, Figure 1.
Figure 6 is a view similar to Figure 4 but illustrating a slight modification more effective for cutting hair less short than the form shown in Figure 4.

In Figure 6 is shown a slightly modified form of the attachment, the body being designated 110. The sides of said attachment having the teeth 116 lie away from the blades $a$ being offset as at 18 so that the central portion of the attachment 10 at the back of the blades is in the form of a channel 19 snugly receiving the blades $a$. The greater distance between the teeth 116 at a side of the attachment and the plane of the cutting edges of the blades in the form shown in Figure 6, it will be observed, is greater than the distance between the teeth 16 and the plane of the cutting edges in Figure 4. Hence, the hair will be cut longer than with the arrangement of Figure 4.

The keyhole slot 12 along the narrowed portion thereof between the ends of such narrowed portion is raised at each side of the slot and the shank is made resilient so that with the raised portion and the resiliency, the shank will be firmly held against displacement when engaged beneath the undercut end 13 of the screw 14.

It is to be noted that the teeth 16 and 116 are at a slight inclination to the medial longitudinal line of the attachment 10. This restrains the hair from slipping from the teeth. Also, said teeth have their rear sides which coact with the cutting edges of the blades, at such an inclination on the attachment 10 as to be substantially perpendicular to said cutting edges of the blades when the blades are in cutting relation so that the said back edges of the teeth are at an angle making for the most effective cutting action in co-operation with the cutting edges of the shears.

The purpose of producing a tapered form in the attachment by reducing the length of the teeth in the series toward the front end of the attachment is to adapt the shears with the attachment thereon to cutting at the top of the ear and around the same where the space for the operation of the shears and the attachment is limited. The slight reduction in the length of the teeth toward the rear end or shank is to give the device symmetry.

The provision of the teeth 16 or 116 at both sides of the shear blades is for cutting with either the right or the left hand.

I would state furthermore that while the illustrated examples constitute practical embodiments of my invention, I do not limit myself strictly to the exact details herein illustrated, since, manifestly, the same can be considerably varied without departure from the spirit of the invention as defined in the appended claims.

Having thus described my invention, I claim:

1. An attachment for shears presenting spaced sides having longitudinal series of teeth, one of said sides having a shank at the rear end formed with a keyhole slot, together with a screw adapted to be passed through shear blades for pivotally connecting the same, said screw having an undercut end to receive said slot at its narrowest portion.

2. An attachment for shears consisting of an approximately U-shaped plate having longitudinal series of teeth at the side edges, the sides of said attachment spaced to fit over shear blades, means to secure said attachment to a shears, and a longitudinal row of combing teeth between the sides of the attachment and disposed in the medial plane of the attachment, said combing teeth extending in the opposite direction from the first-mentioned teeth.

3. An attachment for shears presenting spaced sides having longitudinal series of teeth, one of said sides having a member at the rear end formed with a keyhole slot, the material at the sides of the slot at the narrowest portion of the slot being raised, together with a screw adapted to be passed through the shear blades for pivotally connecting the same, said screw having an undercut end to receive said member at the narrowest portion of the slot.

EUGENE SEAVEY.